(12) United States Patent
Charbonnel

(10) Patent No.: US 8,610,721 B2
(45) Date of Patent: Dec. 17, 2013

(54) WAVE ZONES RENDERING TECHNIQUE

(75) Inventor: Laurent P. Charbonnel, Venice, CA (US)

(73) Assignees: Sony Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 1265 days.

(21) Appl. No.: 12/121,958

(22) Filed: May 16, 2008

(65) Prior Publication Data

US 2008/0284783 A1 Nov. 20, 2008

Related U.S. Application Data

(60) Provisional application No. 60/930,918, filed on May 18, 2007.

(51) Int. Cl.
*G06T 13/00* (2011.01)
(52) U.S. Cl.
USPC .......................................... 345/473; 345/585
(58) Field of Classification Search
USPC ................................................ 345/473, 585
See application file for complete search history.

(56) References Cited

U.S. PATENT DOCUMENTS

2002/0154821 A1* 10/2002 Akiyoshi et al. ............... 382/218
2005/0228625 A1* 10/2005 Lachman ........................... 703/9
2007/0151336 A1* 7/2007 Lake ........................... 73/290 V

OTHER PUBLICATIONS

Loughlin et al. "An Annotation System for 3D Fluid Flow Visualization" VIS '94 Proceedings of the conference on Visualization '94; IEEE Computer Society Press Los Alamitos, CA, USA, 1994.*

* cited by examiner

*Primary Examiner* — Maurice L McDowell, Jr.
(74) *Attorney, Agent, or Firm* — Procopio, Cory, Hargreaves & Savitch

(57) ABSTRACT

Rendering a deforming object in animation including: defining a deforming object surface angle; identifying a normal vector discontinuity point using the deforming object surface angle; defining front part and back part of the deforming object with reference to the normal vector discontinuity point; dividing the front part of the deforming object into zones based on the deforming object surface angle; dividing the back part of the deforming object into zones based on the deforming object surface angle; and rendering each zone.

16 Claims, 5 Drawing Sheets

WAVE ZONES RENDERING TECHNIQUE

CROSS-REFERENCE TO RELATED APPLICATIONS

This application claims the benefit of priority of U.S. Provisional Patent Application No. 60/930,918, filed May 18, 2007, entitled "Making an Animated Documentary." The disclosure of the above-referenced provisional application is incorporated herein by reference.

BACKGROUND

1. Field of the Invention

The present invention relates to rendering deforming objects in animation, and more specifically, to using wave zones to render such deforming objects.

2. Background

For object modeling operations, such as applying a texture to the surface of an object, a mapping between the texture and the surface needs to be performed. This mapping is usually specified using a pair of UV parametric spaces (sometimes referred to as a parameterization), one space defined over the texture and one space defined over the surface of the object.

There are two broadly-defined techniques of assigning a parameterization to a three dimensional object modeled with non-uniform rational BSplines (NURBS): natural parameterization (sometimes referred to as UV mapping) and projection mapping. However, these existing parameterization techniques are not well suited for an object such as a wave. For example, the UV mapping assigns coordinates using the underlying mathematical properties of the NURBS and is therefore attached to the object. Thus, if the object deforms, the UV mapping deforms with the object. Since the wave deforms, the UV mapping technique is incapable of providing consistent answers over time for parts of a wave. As for the projection mapping, since the wave moves, cameras need to be animated to define the projections. Further, since the wave changes shape (e.g., breaking or non-breaking), the camera animation process needs to include manual designation of cameras to be considered. Accordingly, if the wave animation changes, the camera animation process needs to be redone. The projection mapping also needs a further processing to avoid projecting the same value at multiple points on the surface.

SUMMARY

The present invention provides for a novel way to assign a parameterization on a deforming animated object such as a wave.

In one embodiment, a method of rendering a deforming object in animation is disclosed. The method includes: defining a deforming object surface angle; identifying a normal vector discontinuity point using the deforming object surface angle; defining front part and back part of the deforming object with reference to the normal vector discontinuity point; dividing the front part of the deforming object into zones based on the deforming object surface angle; dividing the back part of the deforming object into zones based on the deforming object surface angle; and rendering each zone.

In another embodiment, a computer-readable storage medium storing a computer program for rendering a deforming object in animation is disclosed. The program includes executable instructions that cause a computer to: define a deforming object surface angle; identify a normal vector discontinuity point using the deforming object surface angle; define front part and back part of the deforming object with reference to the normal vector discontinuity point; divide the front part of the deforming object into zones based on the deforming object surface angle; divide the back part of the deforming object into zones based on the deforming object surface angle; and render each zone.

Other features and advantages of the present invention will become more readily apparent to those of ordinary skill in the art after reviewing the following detailed description and accompanying drawings.

DETAILED DESCRIPTION

Certain embodiments as disclosed herein provide for a novel way to assign a parameterization on a deforming animated object such as a wave. The parameterization is assigned in such a way that it does not deform but permit artistic control during rendering. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention. The use of terms such as "shall" and "shall not" and "must" and "must not" are only to indicate compatibility requirements within one embodiment and are not intended to limit the scope of the invention.

Figure 1:
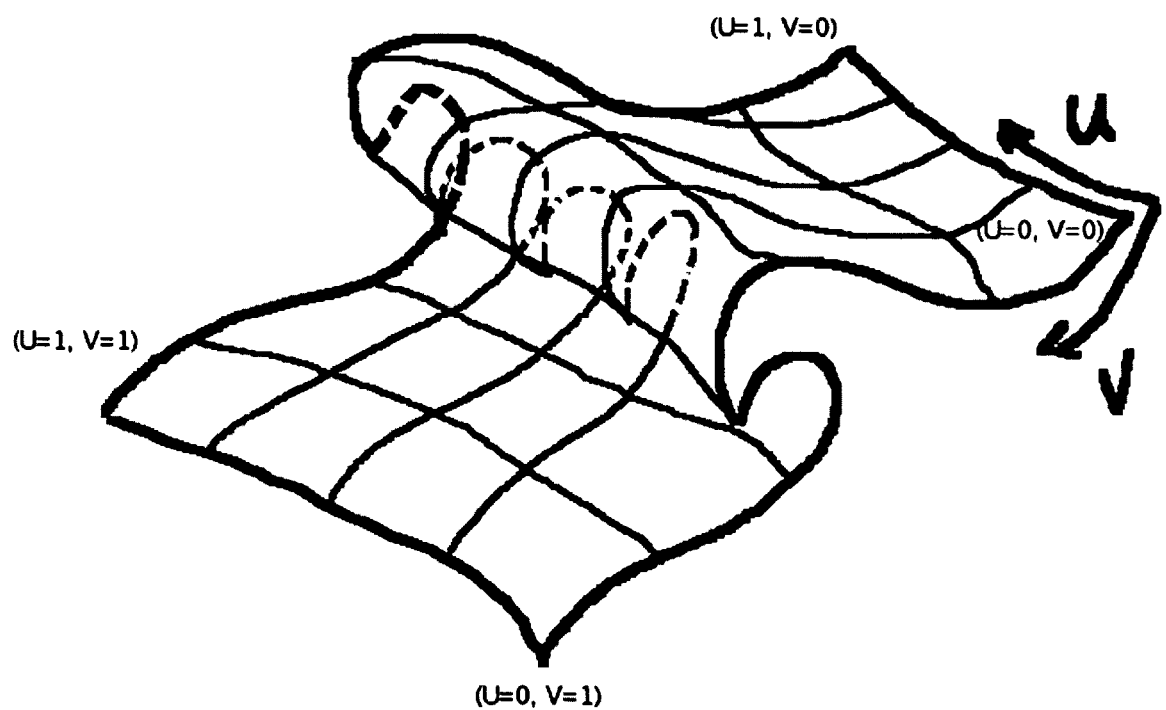
FIG. 1 illustrates one example of the UV mapping which deforms with the breaking of a wave.

As discussed above, there are two broadly-defined techniques of assigning a parameterization to a three dimensional object modeled with NURBS: UV mapping and projection mapping. The UV mapping assigns coordinates using the underlying mathematical properties of the NURBS and is therefore attached to the object. Thus, if the object deforms, the UV mapping deforms with the object. FIG. 1 illustrates one example of the UV mapping which deforms with the breaking of a wave.

Figure 2:
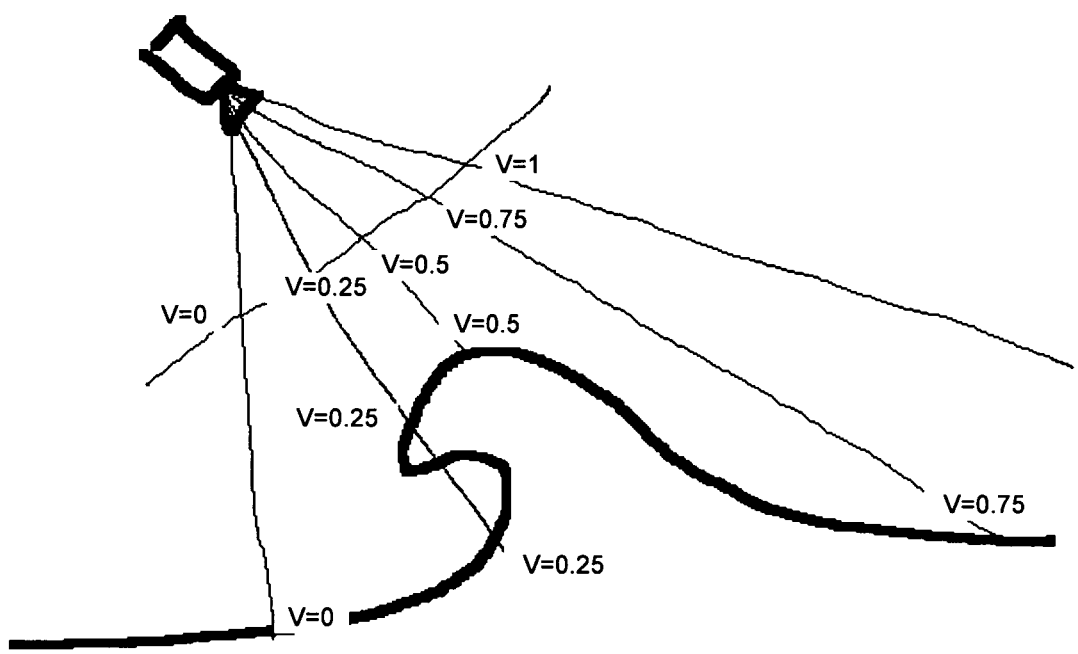
FIG. 2 illustrates a side view of the projection mapping showing the projection of the V parameter.

The projection mapping is programmed as projecting parameterization similar to a slide projector projecting an image. FIG. 2 illustrates a side view of the projection mapping showing the projection of the V parameter. The projection mapping also needs a further processing to avoid projecting the same value at multiple points on the surface. For example, in FIG. 2, V parameter value of 0.25 is assigned to three different points.

Figure 3:
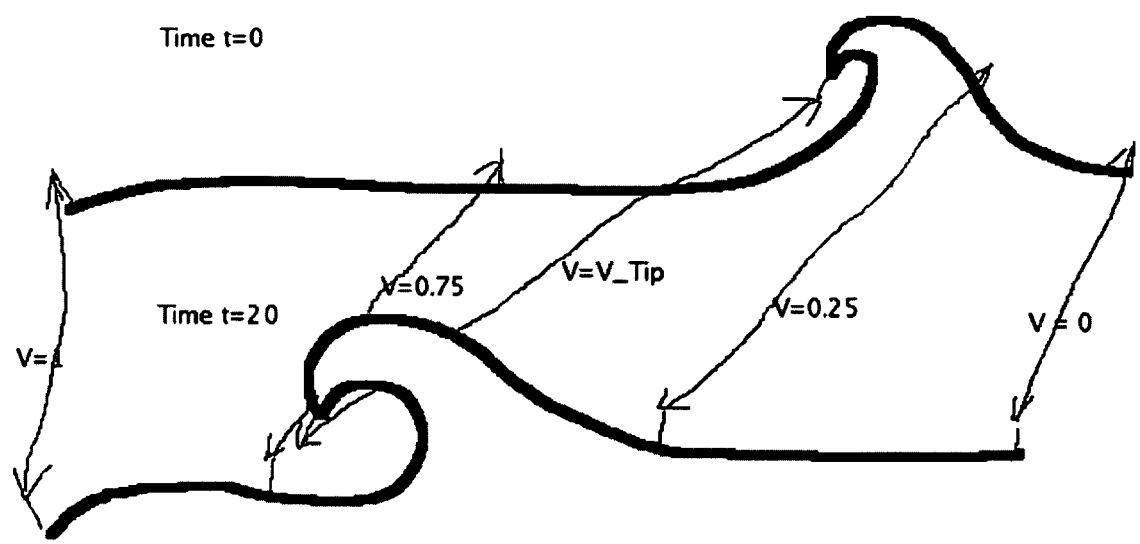
FIG. 3 shows one example of multiple projection mapping.

In another case, multiple projection mapping can be used as shown in FIG. 3. However, since the wave moves, cameras need to be animated to define the projections. Further, since the wave changes shape (e.g., breaking or non-breaking), the camera animation process needs to include manual designation of cameras to be considered. Accordingly, if the wave animation changes, the camera animation process needs to be redone.

To properly render deforming objects such as a wave, the assignment of shader and/or render parameters to different parts of the wave should be performed efficiently. Identifying different parts of the wave also requires proper parameterization. However, as discussed above, none of the existing parameterization techniques were well-suited for objects such as a wave. Since the wave deforms, the UV mapping technique is incapable of providing consistent answers over time for parts of a wave. For example, once the wave has passed, a part that corresponds to the front face of the wave is now behind the wave.

Although various physically-based rendering techniques described above can be considered, a successful animation requires a more flexible way of rendering the waves in order to achieve the required visual style and variety. In one embodiment, a shading technique that makes it possible to render realistic waves with a high degree of art direction uses a local coordinate system in which a series of "wave zones" are calculated using the cylindrical coordinate system of the wave and the parameterization of the wave surface. These zones are separated by angle and represent the various parts of the wave during its life cycle. Each zone is shaded separately and all zones are animated and blended. This allows the light technician to manipulate these zones and almost paint the color of the waves.

The wave zones technique was developed based on the observation that waves break in a similar way and that they have a similar shape when considered from a profile. The angles formed by the normal of a surface point and the vertical vector (positive Y-axis) are similar across the waves types. Wave zones are created based on this angle. The parameterization of the wave surface was normalized with the 0.5 value being equal to the leading edge of the breaking wave. Values less than 0.5 represented the bottom of the wave and those greater than 0.5 represented the top.

Each wave zone is treated as a separate material. These material zones are combined in the shader through blending regions. The surface color derived by these zones is a good approximation of the diffuse and ambient lighting components of the wave. This is combined with other more physically based techniques for the reflection and refraction to achieve a high degree of realism.

Figure 4:
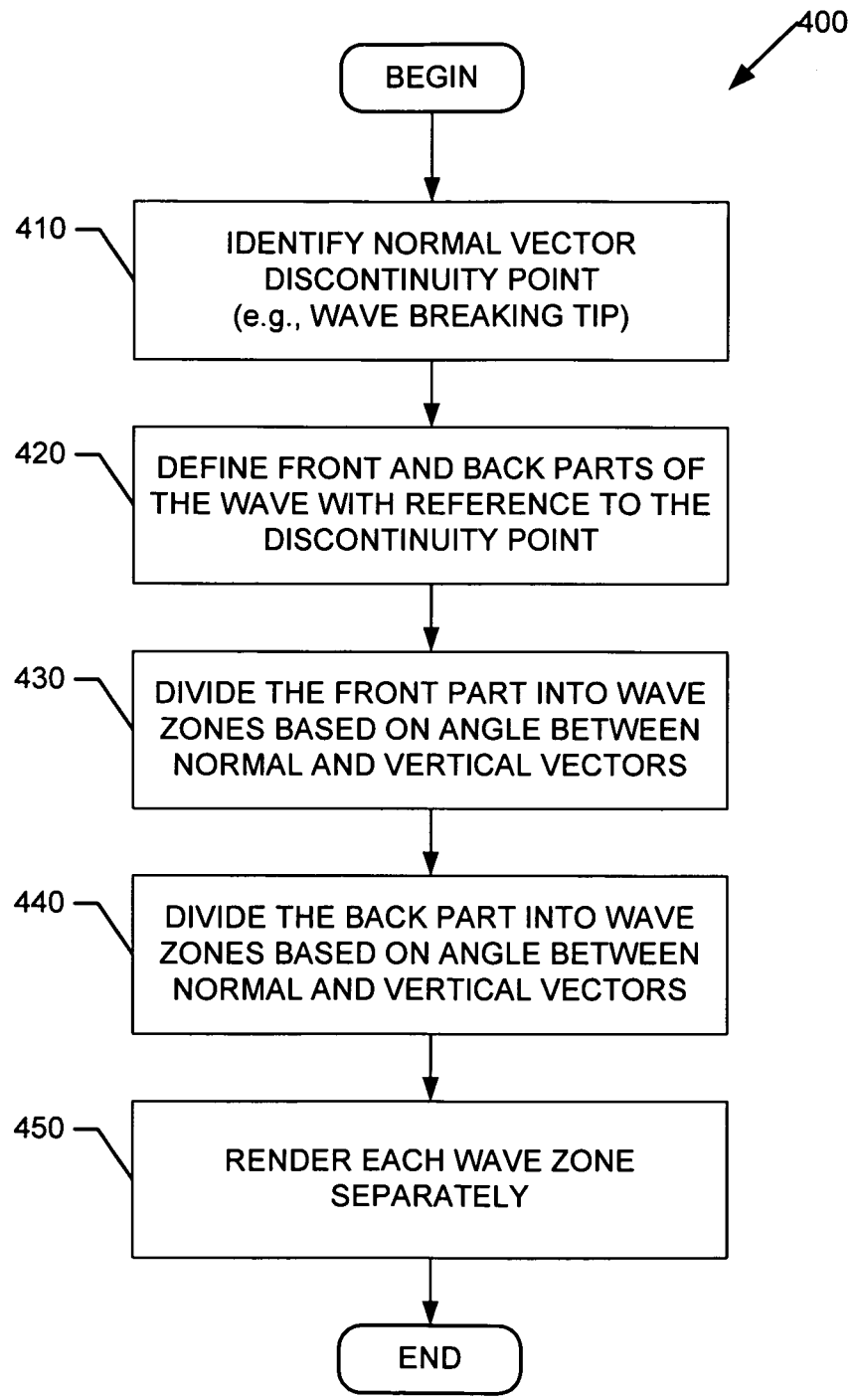
FIG. 4 is a flowchart illustrating a wave zones technique in accordance with one embodiment of the present invention.

FIG. 4 is a flowchart illustrating a wave zones technique 400 in accordance with one embodiment of the present invention. Although the wave zones technique, in the illustrated embodiment, is used to render a wave, this technique can be used (or modified) to render any deforming objects evolving around a rotational axis, such as a tornado twister. The axis of the wave does not have to be straight but any curve that does not bend on itself too much is a "good" axis.

In the illustrated embodiment, the wave zones technique 400 includes initially identifying a normal vector discontinuity point, at box 410. As described above, a wave is shaped such that a different part of the wave (when the wave is in a breaking or non-breaking phase) can be uniquely defined by a wave surface angle formed by: (1) the vector normal to the wave surface at a particular point on the wave; and (2) the vector vertical to the horizontal surface of the ocean without the wave. Thus, the normal vector discontinuity point is defined as a point where the variation in the wave surface angle changes abruptly (or becomes discontinuous). However, different parts of the wave can be uniquely defined by the wave surface angle if the normal vector discontinuity point is identified first, and the part of the wave is determined to be in front or back of the discontinuity point. Again, in other embodiments involving other deforming objects, the discontinuity point may divide the object into top and bottom rather than front and back.

When rendering a wave, the discontinuity point is the tip of the wave breaking point, where the variation of the wave surface angle changes abruptly. Although the wave surface angle is defined as an angle between normal and vertical vectors, the definition of the angle can be modified to measure any angle that defines the orientation of the surface of the wave.

At box 420, the front and back parts of the wave are defined with reference to the normal vector discontinuity point identified in box 410. In one implementation, the front and back parts of the wave are defined by: (1) identifying (from the UV mapping) the V value ($V_{tip}$) that corresponds to the wave breaking tip; (2) marking the part of the wave that has a V value greater than $V_{tip}$ as the front part of the wave (wave_front); and (3) marking the part of the wave that has a V value smaller than $V_{tip}$ as the back part of the wave (wave_back).

The front part of the wave is divided, at box 430, into wave zones based on the wave surface angle determined by the angle between the normal and the vertical vectors. The back part of the wave is divided, at box 440, into wave zones based on the wave surface angle determined by the angle between the normal and the vertical vectors. Once the wave zones have been defined in box 430 and box 440, each zone is rendered, at box 450. In one implementation, each zone is rendered separately.

Figure 5:
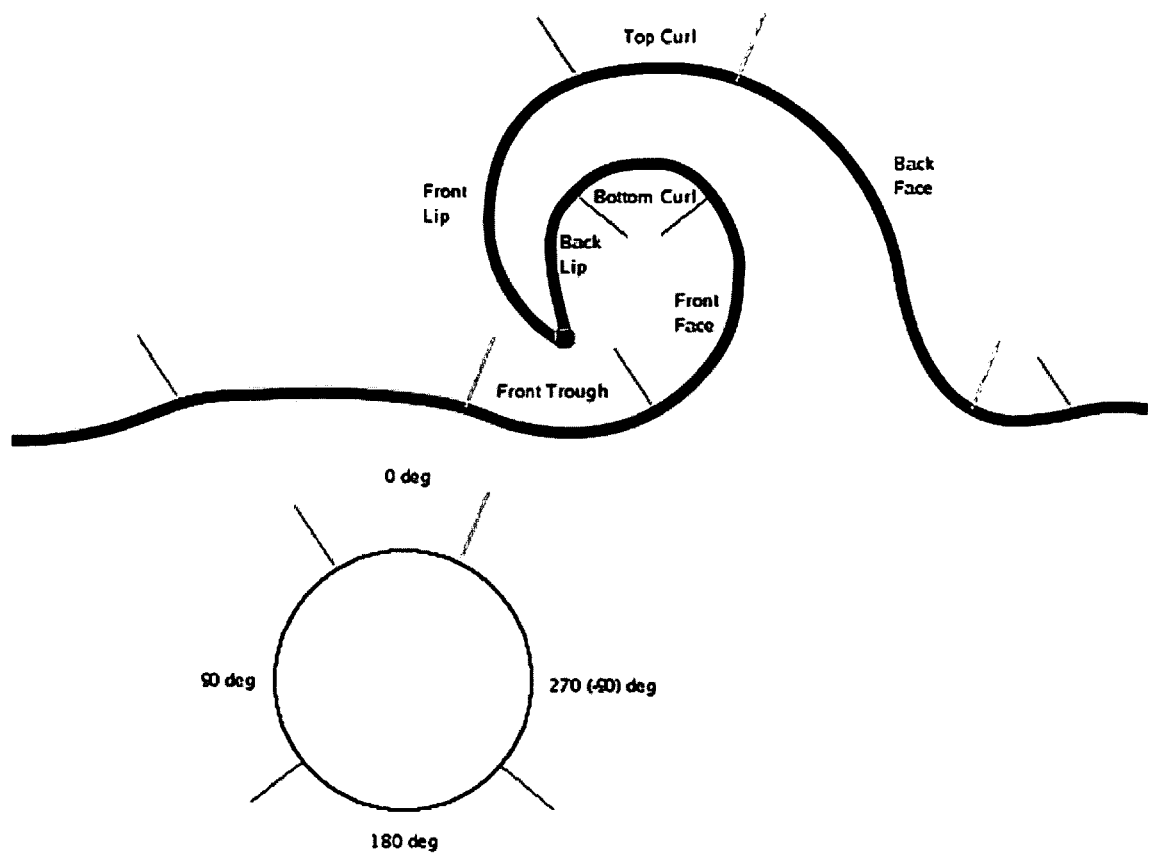
FIG. 5 illustrates one example implementation of dividing the wave into wave zones.

In one implementation shown in FIG. 5, the wave zones are divided as follows:

(1) define four angles (e.g., $angle_1$, $angle_2$, $angle_3$, and $angle_4$);

(2) mark the part of the wave for which the wave surface angle between the normal vector and the vertical vector is between $angle_4$ and $angle_1$, and is already marked as the front part of the wave, as front trough (or wave zone 1);

(3) mark the part of the wave for which the wave surface angle between the normal vector and the vertical vector is between $angle_1$ and $angle_2$, and is already marked as the front part of the wave, as front face (or wave zone 2);

(4) mark the part of the wave for which the wave surface angle between the normal vector and the vertical vector is between $angle_2$ and $angle_3$, and is already marked as the front part of the wave, as bottom curl (or wave zone 3);

(5) mark the part of the wave for which the wave surface angle between the normal vector and the vertical vector is greater than $angle_3$, and is already marked as the front part of the wave, as back lip (or wave zone 4);

(6) mark the part of the wave for which the wave surface angle between the normal vector and the vertical vector is greater than $angle_1$, and is already marked as the back part of the wave, as front lip (or wave zone 5);

(7) mark the part of the wave for which the wave surface angle between the normal vector and the vertical vector is between $angle_4$ and $angle_1$, and is already marked as the back part of the wave, as top curl (or wave zone 6); and (8) mark the part of the wave for which the wave surface angle between the normal vector and the vertical vector is less than $angle_4$, and is already marked as the back part of the wave, as back face (or wave zone 7).

Thus, in this implementation, the zones that correspond to the part of the wave that only exist for a breaking wave automatically appears and disappears when needed without any manual intervention. For example, wave zones 3, 4, and 5 (see FIG. 5; "bottom curl" (zone 3), "back lip" (zone 4), "front lip (zone 5)) do not exist when the wave is not breaking.

The four angles (see Part (1) above) are defined based on an artistic selection about the resulting shape of the wave. Thus, the wave is shaped and textured by how the wave zones are selected.

Although the parts of the wave in the above example implementation were divided into four and three zones, respectively for front and back parts, the wave can be divided into any number of zones based on the wave surface angle or based on any other parameters that can define the wave into visually identifiable parts. Further, although the wave surface angle is defined as an angle between normal and vertical vectors, the definition of the angle can be modified to measure any angle that defines the orientation of the surface of the wave.

Although the process described above (and illustrated in FIG. 5) provides good results in identifying the different wave zones, the transition from one wave zone to another can be sharp in some cases. The process can be refined by defining for each zone with a start angle and an end angle.

Thus, in another implementation, once the discontinuity point is identified, and the front and back parts of the wave are defined, the wave zones can be defined as follows:

(1) define eight angles (e.g., $angle_{1a}$, $angle_{1b}$, $angle_{2a}$, $angle_{2b}$, $angle_{3a}$, $angle_{3b}$, $angle_{4a}$, and $angle_4$);

(2) assign the part of the wave for which the wave surface angle between the normal vector and the vertical vector is between $angle_{4b}$ and $angle_{1a}$, and is already marked as the front part of the wave, a coefficient of 100% front trough (or wave zone 1);

(3) assign the part of the wave for which the wave surface angle ($a_{ws}$) between the normal vector and the vertical vector is between $angle_{1a}$ and $angle_{1b}$, and is already marked as the front part of the wave, a coefficient of $1-(a_{ws}-angle_{1a})/(angle_{1b}-angle_{1a})$ front trough (or wave zone 1);

(4) assign the part of the wave for which the wave surface angle ($a_{ws}$) between the normal vector and the vertical vector is between $angle_{4a}$ and $angle_{4b}$, and is already marked as the front part of the wave, a coefficient of $1-(a_{ws}-angle_{4a})/(angle_{4b}-angle_{4a})$ front trough (or wave zone 1);

(5) assign the part of the wave for which the wave surface angle between the normal vector and the vertical vector is between $angle_{1b}$ and $angle_{2a}$, and is already marked as the front part of the wave, a coefficient of 100% front face (or wave zone 2);

(6) assign the part of the wave for which the wave surface angle ($a_{ws}$) between the normal vector and the vertical vector is between $angle_{1a}$ and $angle_{1b}$, and is already marked as the front part of the wave, a coefficient of $(a_{ws}-angle_{1a})/(angle_{1b}-angle_{1a})$ front face (or wave zone 2);

(7) assign the part of the wave for which the wave surface angle ($a_{ws}$) between the normal vector and the vertical vector is between $angle_{2a}$ and $angle_{2b}$, and is already marked as the front part of the wave, a coefficient of $1-(a_{ws}-angle_{2a})/(angle_{2b}-angle_{2a})$ front face (or wave zone 2);

(8) assign the part of the wave for which the wave surface angle between the normal vector and the vertical vector is between $angle_{2b}$ and $angle_{3a}$, and is already marked as the front part of the wave, a coefficient of 100% bottom curl (or wave zone 3);

(9) assign the part of the wave for which the wave surface angle ($a_{ws}$) between the normal vector and the vertical vector is between $angle_{2a}$ and $angle_{2b}$, and is already marked as the front part of the wave, a coefficient of $(a_{ws}-angle_{2a})/(angle_{2b}-angle_{2a})$ bottom curl (or wave zone 3);

(10) assign the part of the wave for which the wave surface angle ($a_{ws}$) between the normal vector and the vertical vector is between $angle_{3a}$ and $angle_{3b}$, and is already marked as the front part of the wave, a coefficient of $1-(a_{ws}-angle_{3a})/(angle_{3b}-angle_{3a})$ bottom curl (or wave zone 3);

(11) assign the part of the wave for which the wave surface angle between the normal vector and the vertical vector is greater than $angle_{3b}$, and is already marked as the front part of the wave, a coefficient of 100% back lip (or wave zone 4);

(12) assign the part of the wave for which the wave surface angle ($a_{ws}$) between the normal vector and the vertical vector is between $angle_{3a}$ and $angle_{3b}$, and is already marked as the front part of the wave, a coefficient of $(a_{ws}-angle_{3a})/(angle_{3b}-angle_{3a})$ back lip (or wave zone 4);

(13) assign the part of the wave for which the wave surface angle between the normal vector and the vertical vector is greater than $angle_{1b}$, and is already marked as the back part of the wave, a coefficient of 100% front lip (or wave zone 5);

(14) assign the part of the wave for which the wave surface angle ($a_{ws}$) between the normal vector and the vertical vector is between $angle_{1a}$ and $angle_{1b}$, and is already marked as the back part of the wave, a coefficient of $(a_{ws}-angle_{1a})/(angle_{1b}-angle_{1a})$ front lip (or wave zone 5);

(15) assign the part of the wave for which the wave surface angle between the normal vector and the vertical vector is between $angle_{4b}$ and $angle_{1a}$, and is already marked as the back part of the wave, a coefficient of 100% top curl (or wave zone 6);

(16) assign the part of the wave for which the wave surface angle ($a_{ws}$) between the normal vector and the vertical vector is between $angle_{1a}$ and $angle_{1b}$, and is already marked as the back part of the wave, a coefficient of $1-(a_{ws}-angle_{1a})/(angle_{1b}-angle_{1a})$ top curl (or wave zone 6);

(17) assign the part of the wave for which the wave surface angle ($a_{ws}$) between the normal vector and the vertical vector is between $angle_{4a}$ and $angle_{4b}$, and is already marked as the back part of the wave, a coefficient of $(a_{ws}-angle_{4a})/(angle_{4b}-angle_{4a})$ top curl (or wave zone 6);

(18) assign the part of the wave for which the wave surface angle between the normal vector and the vertical vector is less than $angle_{4b}$, and is already marked as the back part of the wave, a coefficient of 100% back face (or wave zone 7); and

(19) assign the part of the wave for which the wave surface angle ($a_{ws}$) between the normal vector and the vertical vector is between $angle_{4a}$ and $angle_{4b}$, and is already marked as the back part of the wave, a coefficient of $1-(a_{ws}-angle_{4a})/(angle_{4b}-angle_{4a})$ back face (or wave zone 7).

Using the refined process, a region can belong to multiple zones but the sum of all the coefficients will always be 1.

The eight angles (see Part (1) above) are defined based on an artistic selection about the resulting shape of the wave. Thus, the selection of the eight angles determines the smoothness of transition from one wave zone to another.

In one example implementation, the wave zones rendering technique was used in animation Surf's Up. In the early stages of production the team was confronted with the fact that the waves defined the sequences they were in. The waves are a moving environment created and animated in layout, similar to a standard set that would be built and dressed. The waves include hollow tubes for a sequence in which the main characters enjoy a perfect day in the surf, as well as powerful, monstrous 60 foot waves that are showcased in the finale. With that amount of diversity in mind it was important to be able to define every feature of the wave and create several different types and styles of waves. When coupled with the challenging process of animating a wave with the specific interaction of a surfer, it was ultimately decided that it was best to treat the wave as a character rather than a procedural effect. Thus, the waves of Surf's Up were not simulated, but instead constructed using a procedurally driven animation rig designed using the wave zones technique.

A single cross-section of the wave was modeled by hand using a NURBS curve profile along with several target blendshapes to simulate the profile's life-cycle over time. About eleven blendshape targets approximated the full life of a breaking "pipeline" wave from birth to resolve. A single 0-1 time attribute was rigged to drive the wave though all of these targets. In addition to the life-cycle shapes, other blendshape curves were introduced to further shape the wave; controlling aspects like lip thickness, depth of the trough, wave height, slope of the front face, and other related parameters. At the heart of the Surf's Up wave is this single curve with multiple blendshape targets to mimic various wave shapes and behaviors. Not only was the curve shape important, but the placement and interpolation of the control vertices over time was critical for driving how ocean texture moved, stretched, and compressed over the wave surface.

A series of these blendshape cross-sections were placed in a row and lofted to form the single wave surface. Independent control over each cross-section's time attribute was maintained allowing different parts of the wave to be more, or less, evolved. In the beginning of the wave's life (time=0 at every cross-section) the geometry was simply a rectangular patch. As time along the length of the wave patch was increased the wave shape began to evolve and deform out of the center line of the patch.

Although initially there were fears about problems at the transition between the wave and ocean, it soon became clear that having a rectangular wave patch that was easy to navigate parametrically was highly desirable and that seaming the wave and the ocean together could be achieved relatively simply by rendering an opacity hole in the ocean where the wave was, while insuring a small geometric overlap between the surfaces. This was achieved by rendering, from an orthographic camera, a map of the UV space of the wave patch cast into the flattened space of $P_{ref}$. Included in these tiff-encoded UV projection maps was the transform matrix of the camera which was used in the shader to position the textures correctly back onto the geometry during render time. Using the projected UV space of the map, the shader cut a hole in the ocean surface and managed the opacity overlap between the wave and ocean creating a seamless transition between the two.

A particularly difficult problem in creating a convincing-looking crashing wave from a series of cross-sectional blend shapes was designing the way surface features, such as wave trains and foam, moved and stretched as the wave traveled through the water. $P_{ref}$ solved this problem by providing a reference space where anything cast into it could be projected onto the wave surface and, given plausible wave animation, would result in realistic stretching and movement across and up the deforming wave. In a process similar to the tweaking of UV texture spaces for animated characters, hundreds of hours were spent hand tailoring $P_{ref}$ spaces for each wave style (Pipeline, Mavericks, Spilling Breaker and the Swell) to produce realistic motion of the surface features of the wave. In order to achieve a seamless blend between the character wave and the surrounding ocean the $P_{ref}$ position at the edge of wave equaled the wave position of the ocean ensuring that no discontinuities between the two would occur.

The description herein of the disclosed embodiments is provided to enable any person skilled in the art to make or use the invention. Numerous modifications to these embodiments would be readily apparent to those skilled in the art, and the principals defined herein can be applied to other embodiments without departing from the spirit or scope of the invention. Thus, the invention is not intended to be limited to the embodiments shown herein but is to be accorded the widest scope consistent with the principal and novel features disclosed herein.

Various implementations of the invention are realized in electronic hardware, computer software, or combinations of these technologies. Some implementations include one or more computer programs executed by one or more computing devices. In general, the wave zones technique is implemented on a computer that includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A non-transitory computer-readable storage medium storing a computer program to render a deforming object in animation, the computer program comprising executable instructions that cause a computer to:
    define a deforming object surface angle at a first point by:
        calculating a first vector that is normal to the surface of the deforming object at the first point on the deforming object;
        calculate a second vector that is vertical to a horizontal surface of an area formed around the deforming object; and calculate an angle between the first vector and the second vector to define the deforming object surface angle;
identify a normal vector discontinuity point using the deforming object surface angle,
wherein the normal vector discontinuity point is defined as a point where a variation in the deforming object surface angle changes abruptly;
define front part and back part of the deforming object with reference to the normal vector discontinuity point;
define a first span of the deforming surface angle of the front part;
define a second span of the deforming surface angle of the back part;
divide the front part of the deforming object into a predetermined number of zones by dividing the first span by the predetermined number so that each zone includes an area of the front part within a fixed range of the deforming surface angle;
divide the back part of the deforming object into the predetermined number of zones by dividing the second span by the predetermined number so that each zone includes an area of the back part within a fixed range of the deforming surface angle; and
render each zone separately.

2. The non-transitory computer-readable storage medium of claim 1, wherein the deforming object is a wave.

3. The non-transitory computer-readable storage medium of claim 1, wherein the deforming object is a tornado.

4. The non-transitory computer-readable storage medium of claim 1, wherein executable instructions that cause a computer to identify a normal vector discontinuity point comprises executable instructions that cause a computer to
identify a point where variation in the deforming object surface angle changes abruptly.

5. The non-transitory computer-readable storage medium of claim 1, wherein the deforming object is a wave, the deforming object surface angle is a wave surface angle, and
wherein the normal vector discontinuity point is a wave breaking tip.

6. The non-transitory computer-readable storage medium of claim 5, wherein executable instructions that cause a computer to define front part and back part of the wave comprises executable instructions that cause a computer to:
identify a first parametric value corresponding to the wave breaking tip;
mark a part of the wave that has a parametric value greater than the first parametric value as the front part of the wave; and
mark a part of the wave that has a parametric value smaller than the first parametric value as the back part of the wave.

7. The non-transitory computer-readable storage medium of claim 5, wherein executable instructions that cause a computer to divide the front part of the deforming object into zones comprises executable instructions that cause a computer to:
define four angles as a first angle, a second angle, a third angle, and a fourth angle;
mark a part of the wave in which the wave surface angle is between the fourth angle and the first angle as a first wave zone;
mark a part of the wave in which the wave surface angle is between the first angle and the second angle as a second wave zone;
mark a part of the wave in which the wave surface angle is between the second angle and the third angle as a third wave zone; and
mark a part of the wave in which the wave surface angle is greater than the third angle as a fourth wave zone.

8. The non-transitory computer-readable storage medium of claim 1, further comprising executable instructions that cause a computer to
display the deforming object rendered with zones defined for the deforming object.

9. A non-transitory computer-readable storage medium storing a computer program for rendering a deforming object in animation, the program comprising executable instructions that cause a computer to:
define a deforming object surface angle;
identify a normal vector discontinuity point using the deforming object surface angle by identifying a point where variation in the deforming object surface angle changes abruptly;
define front part and back part of the deforming object with reference to the normal vector discontinuity point;
define a first span of the deforming surface angle of the front art;
define a second span of the deforming surface angle of the back part;
divide the front part of the deforming object into a predetermined number of zones by dividing the first span by the predetermined number so that each zone includes an area of the front part within a fixed range of the deforming surface angle;
divide the back part of the deforming object into the predetermined number of zones by dividing the second span by the predetermined number so that each zone includes an area of the back part within a fixed range of the deforming surface angle; and
render each zone separately.

10. The storage medium of claim 9, wherein the deforming object is a wave.

11. The storage medium of claim 9, wherein the deforming object is a tornado.

12. The storage medium of claim 9, wherein the executable instructions that cause a computer to define a deforming object surface angle comprises executable instructions that cause a computer to:
calculate a first vector that is normal to the surface of the deforming object at a first point on the deforming object;
calculate a second vector that is vertical to a horizontal surface; and
calculate an angle between the first vector and the second vector to define the deforming object surface angle at the first point.

13. The storage medium of claim 9, wherein the deforming object is a wave, the deforming object surface angle is a wave surface angle, and
wherein the normal vector discontinuity point is a wave breaking tip.

14. The storage medium of claim 13, wherein the executable instructions that cause a computer to define front part and back part of the wave comprises executable instructions that cause a computer to:
identify a first parametric value corresponding to the wave breaking tip;
mark a part of the wave that has a parametric value greater than the first parametric value as the front part of the wave; and mark a part of the wave that has a parametric value smaller than the first parametric value as the back part of the wave.

15. The storage medium of claim 13, wherein the executable instructions that cause a computer to divide the front part of the deforming object into zones comprises executable instructions that cause a computer to:
define four angles as a first angle, a second angle, a third angle, and a fourth angle;
mark a part of the wave in which the wave surface angle is between the fourth angle and the first angle as a first wave zone;
mark a part of the wave in which the wave surface angle is between the first angle and the second angle as a second wave zone;
mark a part of the wave in which the wave surface angle is between the second angle and the third angle as a third wave zone; and
mark a part of the wave in which the wave surface angle is greater than the third angle as a fourth wave zone.

16. The storage medium of claim 9, further comprising executable instructions that cause a computer to
display the deforming object rendered with zones defined for the deforming object.

* * * * *